(12) United States Patent
Tuchelt et al.

(10) Patent No.: US 11,654,418 B2
(45) Date of Patent: May 23, 2023

(54) METHOD AND SYSTEM FOR PELLETIZING SPENT BLEACHING EARTH

(71) Applicant: TITAN CLEAN ENERGY PROJECTS CORPORATION, Craik (CA)

(72) Inventors: Maurice Tuchelt, Craik (CA); Jamie Bakos, Craik (CA); Roger Sarrazin, Saskatoon (CA)

(73) Assignee: TITAN CLEAN ENERGY PROJECTS CORPORATION, Craik (CA)

( * ) Notice: Subject to any disclaimer, the term of this patent is extended or adjusted under 35 U.S.C. 154(b) by 276 days.

(21) Appl. No.: 16/840,900

(22) Filed: Apr. 6, 2020

(65) Prior Publication Data

US 2021/0308653 A1    Oct. 7, 2021

(51) Int. Cl.
| | |
|---|---|
| *B01J 20/34* | (2006.01) |
| *B01J 20/12* | (2006.01) |
| *B01J 20/20* | (2006.01) |
| *C01B 3/02* | (2006.01) |
| *C10G 2/00* | (2006.01) |
| *C10L 3/00* | (2006.01) |

(52) U.S. Cl.
CPC .......... *B01J 20/3483* (2013.01); *B01J 20/12* (2013.01); *B01J 20/20* (2013.01); *B01J 20/3416* (2013.01); *B01J 20/3433* (2013.01); *C01B 3/02* (2013.01); *C10G 2/30* (2013.01); *C10L 3/00* (2013.01); *C10G 2300/1003* (2013.01)

(58) Field of Classification Search
CPC .... B01J 20/3483; B01J 20/12; B01J 20/3416; C10G 2/30
See application file for complete search history.

(56) References Cited

U.S. PATENT DOCUMENTS

| | | | |
|---|---|---|---|
| 341,651 A | 5/1886 | Gilman | |
| 4,285,832 A * | 8/1981 | Orth, Jr. | .................. C11B 13/04 502/80 |
| 2017/0037322 A1* | 2/2017 | Dutta | ....................... C10G 3/42 |
| 2017/0107334 A1 | 4/2017 | Mohanty et al. | |

FOREIGN PATENT DOCUMENTS

CA    2945688 A1    9/2015

OTHER PUBLICATIONS

Tsai et al., J. Analy. and Applied Pyrolysis, (2002), v.63, p. 157-170.*

* cited by examiner

*Primary Examiner* — Yong L Chu
(74) *Attorney, Agent, or Firm* — Dickinson Wright PLLC; Andrew D. Dorisio

(57) ABSTRACT

The present disclosure includes a process for pelletizing a spent bleaching earth (SBE) into a clay-biocarbon composite including classifying the SBE based on at least one parameter of the SBE, selecting at least one filler compound and mixing the at least one filler compound with the SBE to make a mixture, forming a plurality of pellets out of the mixture, and pyrolyzing the pellets to produce the clay-biocarbon composite. Pyrolyzing a pelleted spent bleaching earth (SBE) may include advancing the pelleted SBE with a distributer to a first thermal chamber for providing even thermal processing, releasing the pelleted SBE to an auger to cool to room temperature, and condensing at least one volatile compound emitted from the pelleted SBE during thermal processing to produce a condensate for reuse.

18 Claims, 3 Drawing Sheets

METHOD AND SYSTEM FOR PELLETIZING SPENT BLEACHING EARTH

FIELD

This invention is in the field of processing spent bleaching earth (SBE), and more specifically to pelletizing spent bleaching earth.

BACKGROUND

Bleaching products, commonly called bleaching earth or bleaching clay, are typically comprised of naturally occurring mined products that are manipulated by processes including acid activation and heat treatment to enhance the filtration effectiveness of these products. Refining is an important step in the production of edible oils. Bleaching of the crude vegetable oil is a vital part of that process in order to decolorize the vegetable oil and remove contaminants detrimental to the appearance and longevity of the final product. Bleaching adsorption using clay, zeolite, and diatomaceous earth substrates is the most common and cost-effective method to attain high volume production.

SBE is considered a hazardous industrial waste and is commonly disposed in landfill without pre-treatment. The decomposition of SBE in the environment is inhibited by the high oil content and is very slow. Storage of SBE is inadvisable due to ecological reasons as these pollutants may penetrate into the ground water and infiltrate water-bearing horizons. Moreover, their open-air storage may cause spontaneous combustion. Previous efforts to economically regenerate the SBE have resulted in landfill disposal and/or incineration.

U.S. Pat. No. 4,285,832 filed Aug. 11, 1980 by George O. Orth, Jr. describes a method for extracting residual vegetable oil contained in spent bleaching clays used in refining and processing of such oil and for processing the extracted clay for reuse. The spent bleaching clay containing the residual vegetable oil is mixed with water, an organic binder and a plastic clay to form a composition of putty-like consistency which can be formed into particulate solids of suitable size for solvent extraction of the oil. The vegetable oil in the particulate solids is then extracted by solvent extraction with a suitable solvent. The remaining particulate solids with the oil removed may be retorted to produce an activated carbon/clay product useful to lighten the color of the oil being processed, as a filter aid, for water treatment purposes or for other uses where activated carbon is generally used.

SUMMARY

Any and all aspects as described herein, individually or in any combination consistent to one of skill in the art.

The present disclosure includes a process for pelletizing a spent bleach earth (SBE) into a clay-biocarbon composite including classifying the SBE based on at least one parameter of the SBE, selecting at least one filler compound and mixing at least one filler compound with the SBE to make a mixture, forming a plurality of pellets out of the mixture, and pyrolyzing the pellets to produce the clay-biocarbon composite.

In one aspect the process for pyrolyzing a pelleted spent bleach earth (SBE) includes advancing the pelleted SBE with a distributer to a first thermal chamber for providing even thermal processing, releasing the pelleted SBE to an auger to cool to room temperature, and condensing at least one volatile compound emitted from the pelleted SBE during thermal processing to produce a condensate for reuse. The process may further include producing and storing a pyrolysis oil from the condensate. In another aspect, the process may include removing water and oxygen from the condensate to produce a drop-in liquid fuel.

In another aspect the process may include destroying any toxic compounds, such as dioxins and furans, in the syngas in a secondary chamber within the first thermal chamber.

The process may further include advancing the pellets with a distributer to a first thermal chamber for providing even thermal processing of the pellets.

In one aspect, the pellets may have granular shape.

In another aspect, the filler compound may be selected from, but not limited to, lime, bentonite, citric acid, fine biocarbon, softwood, calcium, and iron.

In one aspect, the pellets may advance through the first thermal chamber for approximately 20-minutes to 100-minutes. The temperature of the first thermal chamber may be controlled to about 400° C. to about 900° C. Furthermore, the first thermal chamber may be ventilated to allow combustion of liquid and gaseous fuels to keep the first thermal chamber at temperature.

In one aspect, the process may include emitting at least one volatile compound from the pellets and condensing at least one volatile compound into a condensate.

In another aspect, the process may include producing and storing a pyrolysis oil from the condensate.

In one aspect the process may include removing water and oxygen from the condensate to produce a drop-in liquid fuel.

The first thermal chamber may include a secondary chamber to destroy any toxins in the syngas. In another aspect the process may include heating the secondary chamber to approximately 1100° C.

There is a significant value-proposition if the oil and the bleaching earth can be recovered and repurposed.

DESCRIPTION OF THE DRAWINGS

While the invention is claimed in the concluding portions hereof, example embodiments are provided in the accompanying detailed description which may be best understood in conjunction with the accompanying diagrams:

DETAILED DESCRIPTION

Throughout the following description specific details are set forth in order to provide a more thorough understanding to persons skilled in the art. However, well known elements may not have been shown or described in detail to avoid unnecessarily obscuring the disclosure. The following description is not intended to be exhaustive or to limit the invention to the precise form of any exemplary embodiment. Accordingly, the description and drawings are to be regarded and interpreted in an illustrative, rather than a restrictive, sense.

Bleaching components may be used to decolorize the oil and may comprise natural bleaching earths for treating animal fats, acid-activated bleaching earths for removing impurities, activated carbon, for removing polyaromatic hydrocarbons and pollutants, synthetic amorphous silica compounds for removing phosphatides, metals and soaps, and sodium metabisulphite for decoloring the products that oxidize the impurities. Furthermore, dry bleaching earth can also be used such that the oil is heated before mixing with the bleaching earth and then mixing a citric acid solution, if desirable to bind trace metals and decompose any residual soap. The oil is then mixed with bleaching earth, for refining edible oils, hemp or cannabidiol and biodiesel. These bleaching components may be a common and cost-effective method to attain high volume production of the oils or biodiesel; however, this method also generates a substantial waste stream of SBE. The bleaching components may comprise clay, zeolite, and diatomaceous earth substrates.

In use, the bleaching components may be formed into a number of pellets and stored in a tank receiving edible oils to be refined. Alternatively or in addition to the tank processing, the pellets may be placed in a flow of the edible oils. Once the pellets have become saturated, the pellets may be transformed into SBE. The SBE may be a viscous mud-like substance at this stage.

The SBE may be considered a hazardous industrial waste and may be commonly buried in landfill without pre-treatment. The SBE may be susceptible to spontaneous combustion; consequently, handling and disposing of the SBE is a fire risk, an operating expense, and a source of environmental regulatory concerns. Therefore, proper management of SBE is desirable, though an unsolved economic and ecological problem. The SBE may comprise one or more spent bleaching components, oil, water, and phospholipids, metals, organic compounds, sulfuric acid, sludge, sulfonic acid, free fatty acids, and other like contaminants that are absorbed and adsorbed during the bleaching process which may be difficult to manage or dispose of due to the diverse composition and/or high quantities of water-insoluble substances, e.g. fatty acids, and macro and micro contaminants.

Figure 1:
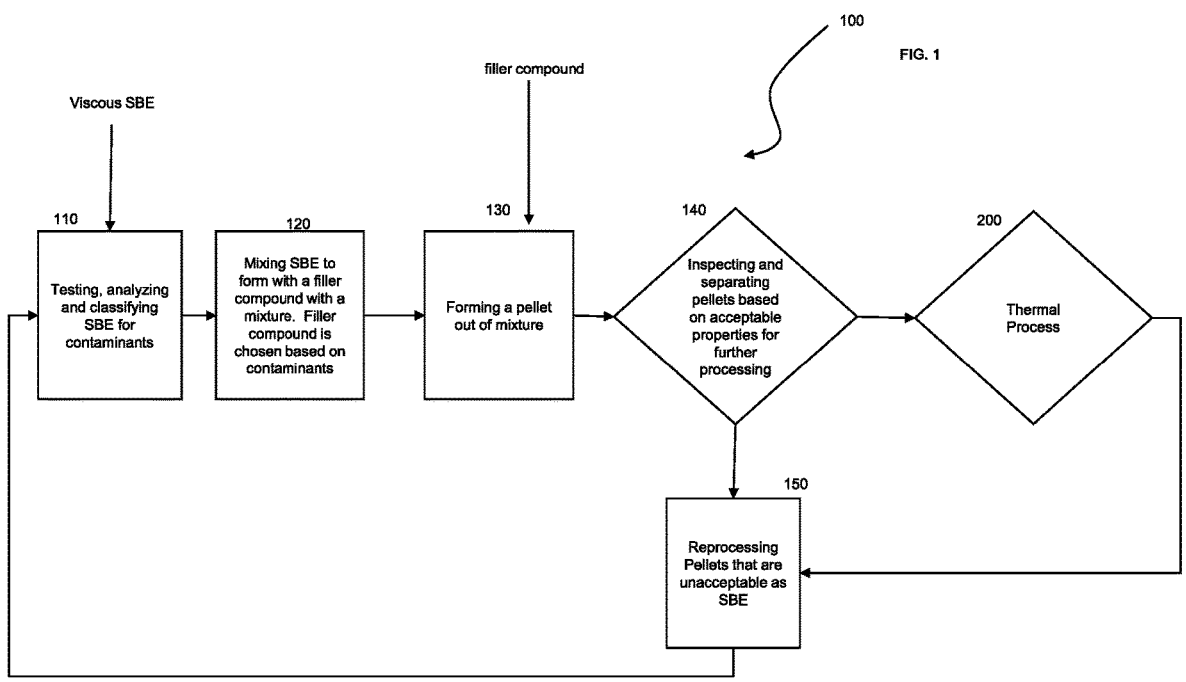
FIG. 1 is a flow chart illustrating a method of pelletizing SBE.

With reference to FIG. 1, the process 100 begins by receiving the viscous SBE where the viscous SBE may be received, tested, analyzed, and classified at step 110. At this stage 110, the viscous SBE may be sent for laboratory testing and analysis to test and analyze the viscous SBE for at least one of oil content, water content, and/or contaminant content. Based on the testing and analysis, one or more parameters of the process 100, 200 as described herein may be adjusted. For example, based on the content(s) of the viscous SBE, a ratio and/or type of a filler compound may be adjusted as an input to a mixing process 120. In this aspect, the mixing process 120 may be performed using a motor mixer to produce a mixed SBE. Alternatively, the viscous SBE may be classified as an acceptable SBE or an unacceptable SBE wherein the acceptable SBE may be processed using the process(es) as described herein and unacceptable SBE may be rejected.

The mixing process 120 may mix such that by a visual inspection the filler compound is completely mixed. The filler compounds may comprise one or more of a ferric oxide, a lime, a bentonite, a citric acid, a screened softwood (e.g. sawdust), a fine biocarbon, calcium, another type of acid, and/or any combination thereof. For example, ferric oxide may be used to assist the removal of hydrogen sulfide from biogas. Table 1 presents a few examples of the filler compounds that may be used for particular applications.

TABLE 1

Filler compounds and their use

| Additive | Use |
| --- | --- |
| lime (CAO) | removes mercaptans |
| bentonite | strengthens pellet |
| citric acid | reductant for copper processing |
| fine biocarbon | odour adsorption |
| softwood | increasing carbon content |
| calcium | odour adsorption |
| iron | Removes hydrogen sulphide |

Figure 3:
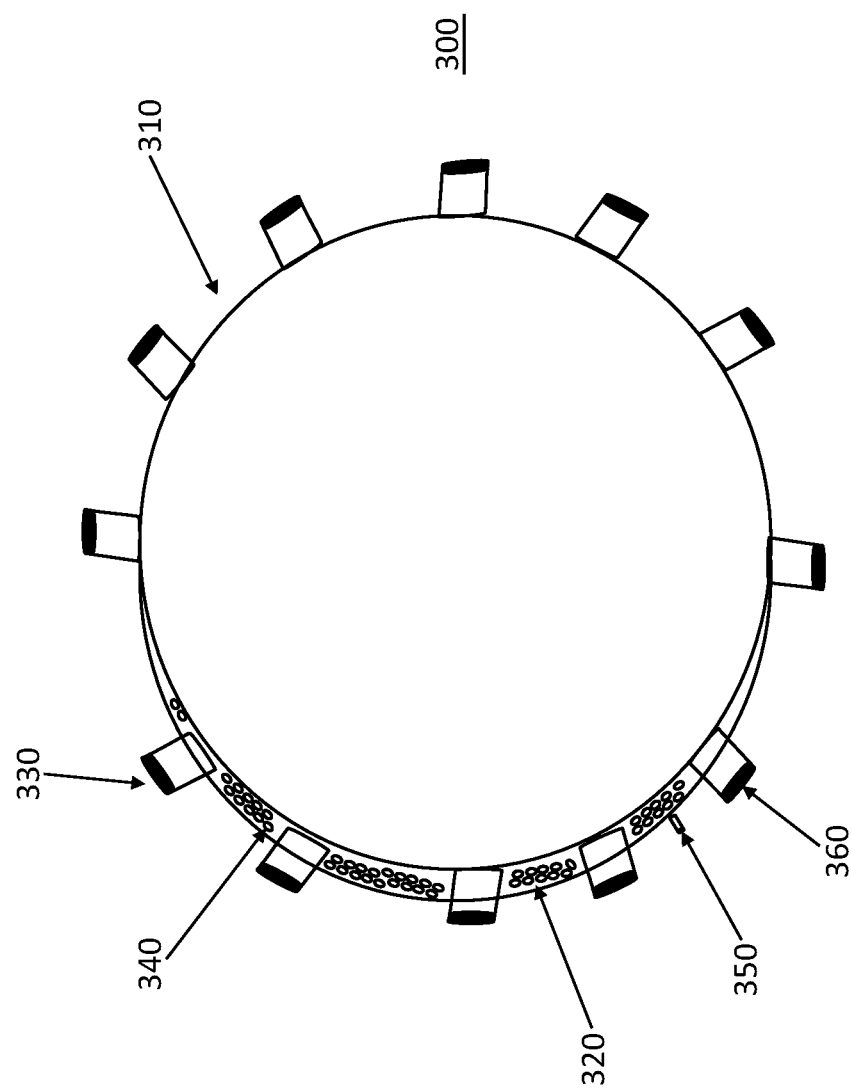
FIG. 3 is a side perspective view of a cut-and-die tool for pelletizing the SBE.

The mixed SBE may be formed into one or more SBE pellets at step 130. In this aspect, a pellet mill, such as a pellet mill manufactured by California Pellet Mill or the like, may be used. Some details of the pellet mill 300 are provided with reference to FIG. 3. The pellet mill 300 may include a roller 310 comprising a die 320 and a cutter 330. The roller 310 forces the mixed SBE out through the die 320 having a plurality of holes 340 with a with a desirable diameter, e.g. ⅜-inch, to shape the mixed SBE 302 into generally cylindrical clusters. Based on the end-user requirement, the cutter 330 may then rotate towards the clusters at a suitable rotational speed to produce a suitable length of SBE pellets 360. In other aspects, the cutter 330 may comprise an oscillating or reciprocating blade to produce the suitable length of SBE pellets 360.

The SBE pellets may be inspected at step 140 using a strength tester to determine a friability and if the SBE pellets are able to withstand thermal processing 200 without complete degradation. Suitability can be measured by crushing a sample pellet with a finger, or using a pellet friability tester. If one or more SBE pellets are unsuitable for the thermal process 200, the unsuitable SBE pellets may be returned to the mixing process 110. For example, the SBE pellets may be unsuitable for having an excessive oil content thereby have excessive viscous properties reducing flowability. In another example, the SBE pellets may be unsuitable for having a friability below an acceptable standard.

The suitable pellets, may have a cylindrical or a spherical shape, but are not limited in scope to these shapes. The suitable pellets may have characteristics that enable high flow rates with low channeling, have low-packing density, high surface activity, high concentration, and are of a substantially carbonaceous structure such that the binding and shape of the pellet remains. Additionally, suitable pellets have granular properties to permit gas and/or liquid to flow evenly therethrough.

Figure 2:
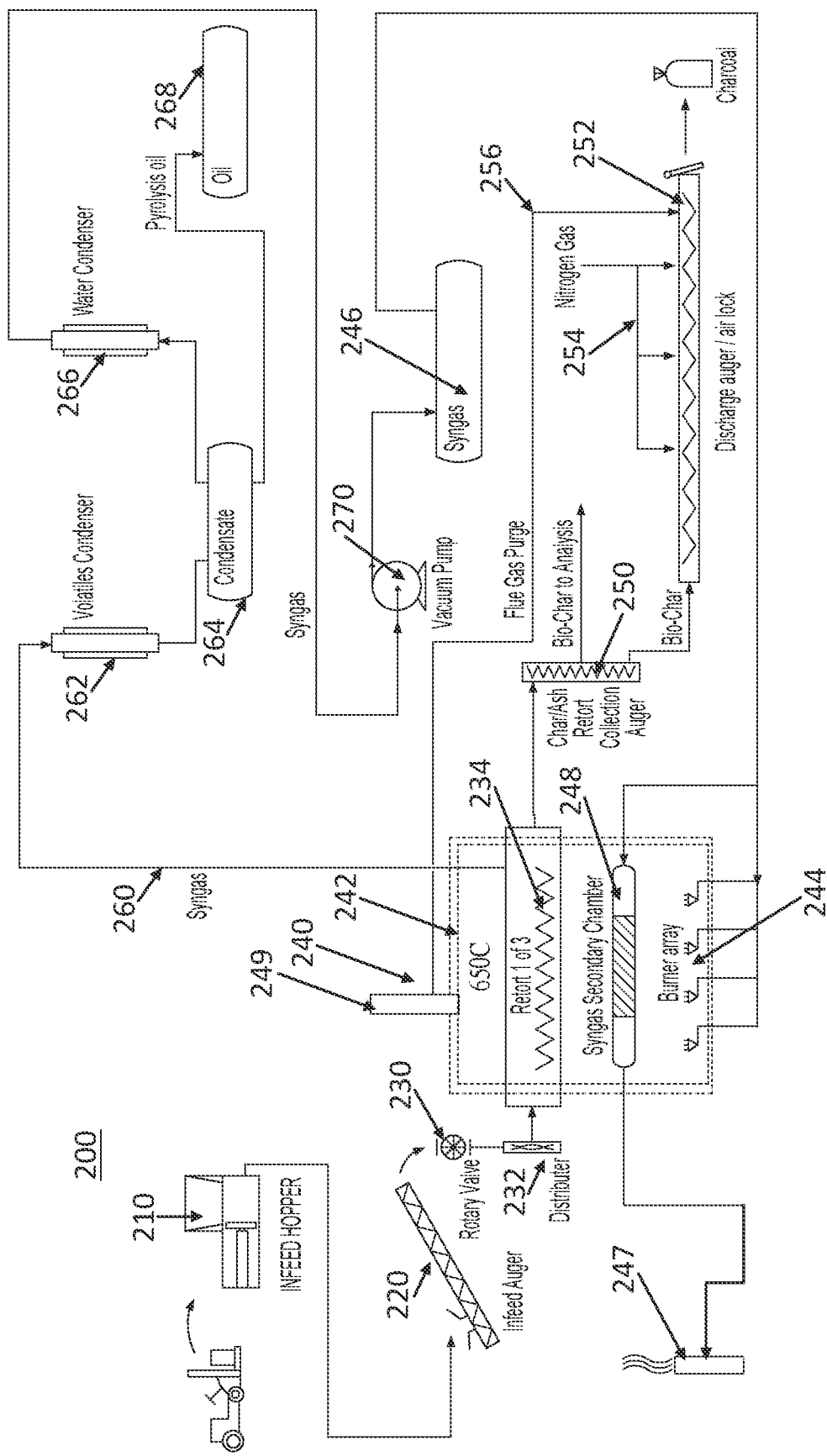
FIG. 2 is a process flow diagram of a pyrolysis plant for thermal processing of the pelletized SBE.

The suitable pellets may then be advanced for thermal processing 200 as described in further detail with reference to FIG. 2. A quantity of the suitable pellets may be provided to an infeed hopper 210 and then through an auger 220 that advances the suitable pellets to a rotary valve 230. In order to reduce shearing of the suitable pellets and permit an even flow of the suitable pellets into each rotary pocket (not shown) of the distributer 232. The distributer may comprise one or more retorts 234 having an auger (not shown) within each retort 234. In this aspect, the three retorts 234 advance the suitable pellets through a thermal chamber 240. The retorts 234 may having tubular shape of 18-20 inch diameters and be temperature controlled. In this aspect, the retorts 234 may advance the suitable pellets such that the time taken for the suitable pellets to pass through the thermal chamber 240 may be about 20-minutes to about 100-minutes. In other aspects, one or more conveyors may be used.

The thermal chamber 240 may comprise an environment of nitrogen and a ventilated chamber 242 such that the pellets equalize with the environment. The ventilated chamber 242 may be heated to a set temperature using a burner array 244 that, in this aspect, combusts a syngas provided by a syngas tank 246. A temperature within the ventilated chamber 242 may be measured using one or more thermocouples (not shown). A controller may receive the temperature measurements and may control the burner array 244 in order to maintain the set temperature within the ventilated chamber 242 in order to pyrolyze the suitable pellets into one or more clay-biocarbon composite pellets. In this aspect, the temperature may be maintained between 400° C. and 900° C. and, as previously mentioned, may be for a time period between 20 to 100 minutes. The temperature and the time period may be dependent on the particular volatile compounds 260, in this aspect a syngas, emitted from the suitable pellets within the thermal chamber 240. For example, the suitable pellets may have a high oil content and may require an increased duration of thermal processing to remove all of the oil from the SBE.

In some aspects, the volatile compounds 260 emitted from the ventilated chamber 242 may be condensed using a condenser 262 to produce a condensate 264. The condensate 264 may be further processed to produce a pyrolysis oil stored within an oil tank 268. A water condenser 266 may be used to remove water from the syngas 260 to produce a renewable gaseous fuel that may be drawn off using a vacuum pump 270 and stored within the syngas tank 246.

In some aspects, a syngas secondary chamber 248 may be used and heated to approximately 1100° C. The syngas secondary chamber 248 may introduce a syngas such as hydrogen, carbon monoxide, methane or combination thereof to the ventilated chamber 242 in which toxins are destroyed within the syngas. The introduction of the syngas may introduce carbon monoxide to the ventilated chamber 242 that may react with the contaminants, the volatile components, and/or the oil within the suitable pellets. A flue gas may exit the ventilated chamber 242 using an exhaust 249. The flue gas may be used to purge the discharge auger 252 as described below. When there is excess syngas, the syngas may be flared using a flare 247.

The clay-biocarbon composite pellets may then exit the thermal chamber 240 in an airtight manner via a retort collection auger 250. One or more samples of the clay-biocarbon composite pellets may be taken from the collection auger 250 for analysis. The collection auger 250 may then deposit the clay-biocarbon composite pellets into a discharge auger 252 in an airtight manner. The discharge auger 252 may have been purged of oxygen using the flue gas and/or nitrogen 254 via one or more valves (not shown). The collection auger 250 and the discharge auger 252 may comprise an atmosphere substantially devoid of oxygen until the clay-biocarbon composite pellets are cooled to room temperature and/or below a spontaneous combustion temperature. The clay-biocarbon composite pellets may then be inspected and, if suitable, be packaged for use, otherwise, the clay-biocarbon composite pellets may be returned to step 130 to be used as one of the filler compounds.

With reference to Table 2 below, the processes and systems 100, 200 as described herein may transform a viscous SBE into raw SBE pellets. The pyrolysis of these SBE pellets produces clay-biocarbon composite pellets with many applications such as adsorption, filtration, and decolorizing edible oils. Raw SBE pellets and their composites are not suitable as they are already spent (partially or fully saturated with oil). However the pyrolyzed SBE and the SBE composites can be used for adsorption, filtration, and decolorizing edible oils. The results of odour testing completed with pyrolyzed SBE and SBE composites is presented in Table 2 hereinafter.

TABLE 2

Odour testing of various raw and pyrolyzed pellets

| Sample # | Raw Pellet composition (Not Pyrolyzed) | Pelletability (%) | Pyrolyzed Product Comments | Odour Control Score |
|---|---|---|---|---|
| 1 | SBE Clay | 76.98 | Hard, not water soluble | 11, Success |
| 2 | SBE Clay + wood | 85.1 | Softer, more powder, not water soluble | 12, Success |
| 3 | SBE Clay + biocarbon | 82.33 | Hard, not water soluble | 9, Success |
| 4 | SBE Clay + biocarbon + wood | 84.96 | Softer, more powder, not water soluble | 8, Marginal |
| 5 | Non SBE Clay + biocarbon + Zeolite | 84.13 | Hard, not water soluble | 1, Fail |

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. A solventless process for producing a pelletized clay-biocarbon composite, the process comprising:
   receiving a spent bleaching earth (SBE) saturated with an oil content;
   mixing at least one filler compound with the SBE to make a mixture;
   forming a plurality of pellets out of from the mixture;
   advancing the pellets comprising the oil content through a thermal chamber;
   pyrolyzing the pellets into the clay-biocarbon composite; and
   condensing a plurality of volatile compounds emitted in the thermal chamber to produce a condensate, wherein the at least one filler compound is selected from a lime, a bentonite, a citric acid, a fine biocarbon, a softwood, a calcium, and an iron.

2. The process of claim 1, wherein the pellets each comprise a granular shape.

3. The process of claim 1, further comprises advancing the pellets with a distributer to the thermal chamber for providing even thermal processing of the pellets.

4. The process of claim 3, wherein the pellets advance through the first thermal chamber for approximately 20-minutes to 100-minutes.

5. The process of claim 3, further comprises ventilating the thermal chamber to equalize the pellets with an environment.

6. The process of claim 3, further comprises controlling a temperature of the thermal chamber from about 400° C. to about 900° C.

7. The process of claim 1, further comprises transforming the at least one volatile compound into a syngas.

8. The process of claim 7, further comprises producing and storing a pyrolysis oil from the condensate.

9. The process of claim 7, further comprises removing water from the syngas to produce a renewable fuel.

10. The process of claim 7, wherein the thermal chamber comprises a secondary chamber to destroy any toxins in the syngas.

11. The process of claim 10, further comprises heating the secondary chamber to approximately 1100° C.

12. The process of claim 7, further comprises combusting the syngas to heat a secondary chamber within the thermal chamber to destroy any toxins in the syngas.

13. The process of claim 1, further comprises releasing the clay-biocarbon composite to an oxygen-free auger and cooling the clay-biocarbon composite to below a spontaneous combustion temperature.

14. The process of claim 13, further comprises purging the auger of oxygen using a flue gas from the thermal chamber.

15. The process of claim 1, wherein pyrolyzing the pellets further comprises:
   advancing the pelleted SBE with a distributer to the thermal chamber for providing even thermal processing; and
   releasing the pelleted SBE to the auger to cool to room temperature.

16. The process of claim 15, further comprises producing and storing a pyrolysis oil from the condensate.

17. The process of claim 15, further comprises removing water from the at least one volatile compound and producing a renewable fuel.

18. The process of claim 15, further comprises destroying any toxins in the secondary chamber wherein the thermal chamber comprises the secondary chamber.

* * * * *